US007483972B2

(12) United States Patent
Bhattacharya et al.

(10) Patent No.: US 7,483,972 B2
(45) Date of Patent: Jan. 27, 2009

(54) NETWORK SECURITY MONITORING SYSTEM

(75) Inventors: Partha Bhattacharya, Cupertino, CA (US); Jan Christian Lawrence, Groton, CT (US)

(73) Assignee: Cisco Technology, Inc., San Jose, CA (US)

( * ) Notice: Subject to any disclaimer, the term of this patent is extended or adjusted under 35 U.S.C. 154(b) by 1346 days.

(21) Appl. No.: 10/443,946

(22) Filed: May 21, 2003

(65) Prior Publication Data

US 2004/0133672 A1 Jul. 8, 2004

Related U.S. Application Data

(60) Provisional application No. 60/439,056, filed on Jan. 8, 2003.

(51) Int. Cl.
*G06F 15/177* (2006.01)
*G06F 11/00* (2006.01)

(52) U.S. Cl. ............................ 709/224; 726/22; 726/23

(58) Field of Classification Search ................. 709/223, 709/224, 229; 726/3, 11, 22, 23, 25
See application file for complete search history.

(56) References Cited

U.S. PATENT DOCUMENTS 5,566,339 A 10/1996 Perholtz et al.
5,929,855 A 7/1999 Benton et al.
6,088,804 A 7/2000 Hill et al.
6,550,012 B1 4/2003 Villa et al.
6,609,205 B1 * 8/2003 Bernhard et al. .............. 726/22
6,647,400 B1 11/2003 Moran
6,728,885 B1 4/2004 Taylor et al.
6,795,918 B1 9/2004 Trolan
6,816,455 B2 11/2004 Goldberg et al.
6,826,697 B1 11/2004 Moran
6,883,162 B2 4/2005 Jackson et al.

(Continued)

FOREIGN PATENT DOCUMENTS

JP 2002/261788 A 9/2002

OTHER PUBLICATIONS

Yener et al., "A Formal Method for Attack Modeling and Detection", Computer Science Department, Rensselaer Polytechnic Institute, Jun. 2001.*

(Continued)

*Primary Examiner*—William C Vaugn, Jr.
*Assistant Examiner*—Yemane Mesfin
(74) *Attorney, Agent, or Firm*—Hickman Palermo Truong & Becker LLP

(57) ABSTRACT

A security monitoring system processes event messages related to computer network security in real time, evaluating inter-event constraints so as to identify combinations of events that are partial solutions to a predefined event correlation rule, and furthermore evaluating combinations of the partial solutions do determine if they together satisfy the predefined event correlation rule. A decision tree is formed based on the rule. Event messages are categorized into groups at leaf nodes of the tree in accordance with a plurality of intra-event constraints, and then the messages are correlated in accordance with a plurality of inter-event constraints at non-leaf nodes of the tree. When the inter-event constraint at a root node of the tree has been satisfied, a network attack alert is issued and protective actions may be taken.

57 Claims, 12 Drawing Sheets

U.S. PATENT DOCUMENTS

| | | | | |
|---|---|---|---|---|
| 6,886,102 | B1 | 4/2005 | Lyle | |
| 2002/0152185 | A1* | 10/2002 | Satish Jamadagni | 706/1 |
| 2003/0033402 | A1 | 2/2003 | Battat et al. | |
| 2003/0093514 | A1* | 5/2003 | Valdes et al. | 709/224 |
| 2003/0120935 | A1 | 6/2003 | Teal et al. | |
| 2003/0165121 | A1 | 9/2003 | Leung et al. | |
| 2003/0182580 | A1 | 9/2003 | Lee | |
| 2003/0200318 | A1 | 10/2003 | Chen et al. | |
| 2004/0049698 | A1 | 3/2004 | Ott et al. | |
| 2004/0098623 | A1 | 5/2004 | Scheidell | |
| 2004/0103021 | A1 | 5/2004 | Scarfe et al. | |
| 2004/0111637 | A1 | 6/2004 | Baffes et al. | |
| 2005/0005017 | A1 | 1/2005 | Ptacek et al. | |
| 2005/0037733 | A1 | 2/2005 | Coleman et al. | |
| 2005/0044406 | A1 | 2/2005 | Stute | |

OTHER PUBLICATIONS

Verwoerd, T. et al., “Intrusion Detection Systems”, Internet Security Research Group, Department of Computer Science, University of Canterbury.

Helmer, Guy G. et al., “Intelligent Agents for Intrusion Detection,” Iowa State University, Ames Iowa 50011, 4 pages.

Lam, Kwok-Yan et al., “Multivariate Data Analysis Software for Enhancing System Security,” Journal of Systems Software, Dec. 1995, vol. 31, Issue 3, pp. 267-275.

Ning, Peng et al., “Abstraction-Based Intrusion Detection In Distributed Environments,” 2001, ACM Transactions on Information and System Security (TISSEC), vol. 4, Issue 4, pp. 407-452.

International Searching Authority, “Notification of Transmittal of the International Search Report and the Written Opinion of the International Searching Authority, or the Declaration,” PCT/US04/29185, mailed on Dec. 26, 2005, 8 pages.

* cited by examiner

System Initialization
410

510 — Generate a decision tree and assign a logical operator to each non-leaf node based on the Boolean function of an event correlation rule 520 — Assign an inter-event constraint Fk() to a non-leaf node N, if Fk() can be completely evaluated at N but not at any other node in the sub-tree rooted at N 530 — Assign an intra-event constraint to a leaf node M and identify a set of relevant parameters appearing in at least one inter-event constraint Fk() depending on M

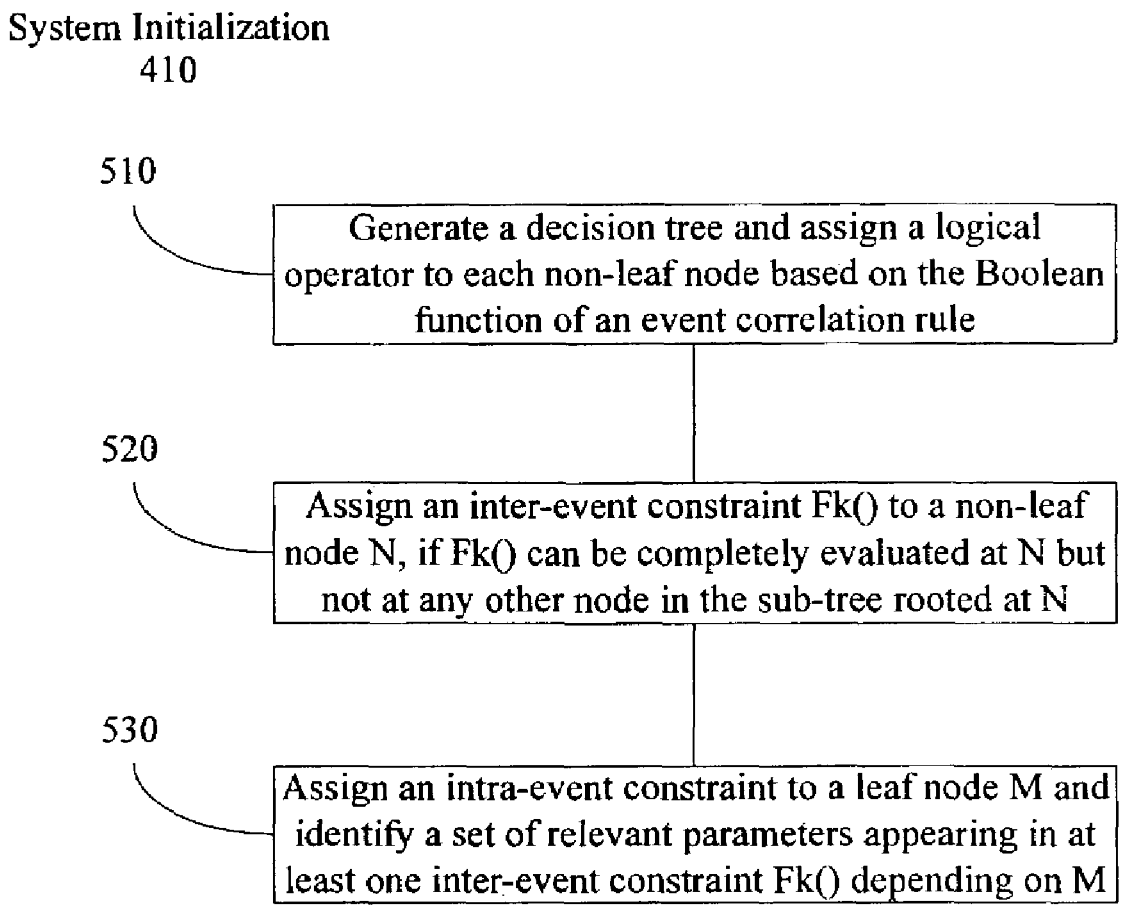

Fig. 5

NETWORK SECURITY MONITORING SYSTEM

CLAIM OF PRIORITY

This application claims priority to U.S. provisional patent application Ser. No. 60/439,056, filed Jan. 8, 2003, entitled A Method for Determining Event Correlation with Constraints.

FIELD OF THE INVENTION

The present invention relates generally to the field of computer network security, and in particular to systems and methods for evaluating security event correlation rules in computer network security.

BACKGROUND OF THE INVENTION

From large business transaction to personal financial management, almost every aspect of our daily life depends on the secure operation of computer networks. People have invested heavily in protecting computer networks from attacks.

The first line of defense against computer network attacks is the denial of access through passwords and firewalls at the node level of a computer network. A limitation of this approach is that it focuses only on certain localized sections of a computer network. However, in many circumstances, a serious attack may comprise multiple steps. Capturing only some of them is not enough for detecting and thwarting the attack.

In order to overcome the deficiency discussed above, multiple security devices such as intrusion detection sensors (IDS) are deployed at different sections of a computer network to detect multiple security-related events simultaneously. As shown in FIG. 1, security devices are attached to routers, firewalls, switches and hosts, etc. Each security device is configured such that whenever it detects a suspicious event, e.g., an IP packet, it sends an event message to a network security monitor. The network security monitor is responsible for correlating diverse events from different parts of the network and providing insights into higher-level attack scenarios.

For various reasons, the data and traffic volume associated with security events have increased dramatically over time. For example, a large number of intrusions can be automated and launched simultaneously from geographically dispersed locations, network link speed is increasing, security devices are becoming faster and generating more data, and single attack can cause multiple events to be generated from various security devices that lie on different network topological paths of that attack. Databases have been used to store this large volume of event messages, and different queries have been designed to correlate multiple event messages in order to detect a high-level attack. A problem with this methodology is that while it performs well as an offline process, it does not scale well to handle a high volume of incoming events in real time. This is because event correlation queries can take substantial time to execute, and such queries have to be repeated either for every received event message, or at periodic intervals in order to provide real time performance. Handling event messages in a real-time fashion is critical for a security event detection system, because only real-time intrusion detected enables mitigation actions to be taken early, before substantial damage is incurred.

Therefore, it would be highly desirable to have a method and apparatus that can correlate event messages in real time as event messages arrive at a network security monitor, and to thereby detect in real time security attacks involving multiple events, even when the attacks include packets sent by multiple distinct sources.

SUMMARY

In summary, a security monitoring system and method process event messages related to computer network security in real time, evaluating inter-event constraints so as to identify combinations of events that are partial solutions to a predefined event correlation rule, and furthermore evaluating combinations of the partial solutions to determine if they together satisfy the predefined event correlation rule.

A decision graph is established for event correlation processing in accordance with the predefined event correlation rule. This decision graph includes multiple leaf and non-leaf nodes. A leaf node is associated with an intra-event constraint and a plurality of event messages that have satisfied the constraint. Each event message is characterized by a set of event parameters.

In one embodiment, a leaf node further comprises a plurality of value sets and partial solutions. The event messages corresponding to the leaf node are organized into value sets such that each set has a unique combination of relevant event parameter values. For each value set, there is a partial solution pointing to it.

When receiving a new event message, the message is compared with the constraint of a leaf node. If there is a match, this message is associated with the leaf node; if not, the messages is compared with the constraint of a next leaf node, if any. When a match is found, data representing the event message is stored in a value set associated with the identified leaf node. If a new value set is required for this event message, a new partial solution pointing to the value set is created. When a new event message is associated with a leaf node, the parent node of the leaf node, a non-leaf node, is invoked for further processing.

A non-leaf node is associated with an inter-event constraint and a plurality of partial solutions. The inter-event constraint correlates multiple events by applying certain restrictions to the events' parameters. Each partial solution stores pointers to partial solutions associated with the child nodes of the non-leaf node, representing the progress of the correlation rule evaluation process.

Upon invocation by one of its child nodes, a non-leaf node retrieves event messages from those corresponding leaf nodes through their partial solution links and applies the retrieved event messages to the inter-event constraint associated with the non-leaf node. If the inter-event constraint is satisfied, the method generates a new partial solution and associates it with the non-leaf node. If the non-leaf node is the root node of the decision graph, the partial solution is further converted into a complete solution to the correlation rule and certain appropriate actions will be taken.

In one embodiment, a plurality of value sets are retrieved from the corresponding leaf nodes rooted at the non-leaf node. Each value set has a unique set of relevant event parameter values. If the inter-event constraint is satisfied by the relevant event parameter values from the corresponding leaf nodes, a partial solution is created for the non-leaf node including a set of pointers to partial solutions associated with the child nodes of the non-leaf node.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 5 is a flowchart illustrating the initialization step of the present invention.

DESCRIPTION OF EMBODIMENTS

The present invention provides a method of processing a stream of event messages sent to a network security monitor from a plurality of security devices in a real-time and on-line fashion.

Figure 2:
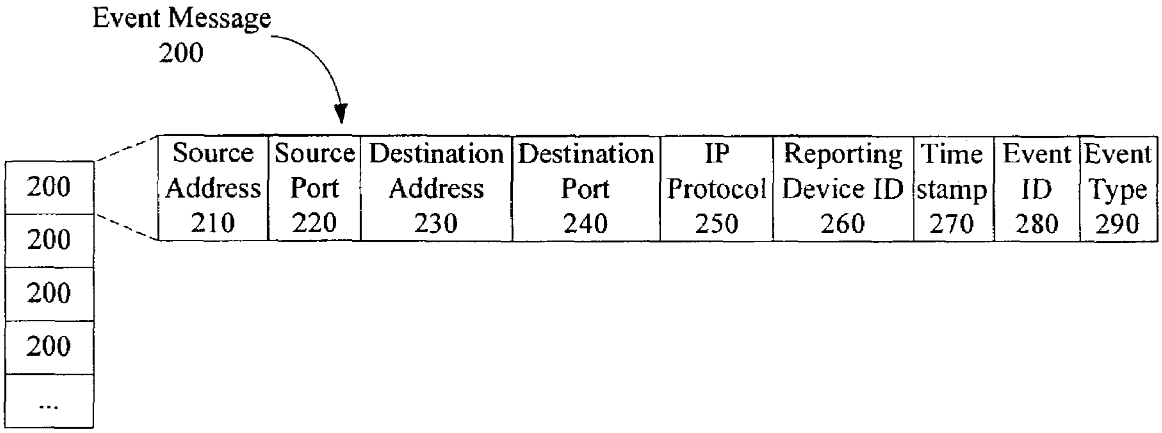
FIG. 2 illustrates a data structure of a event message.
Figure 3:
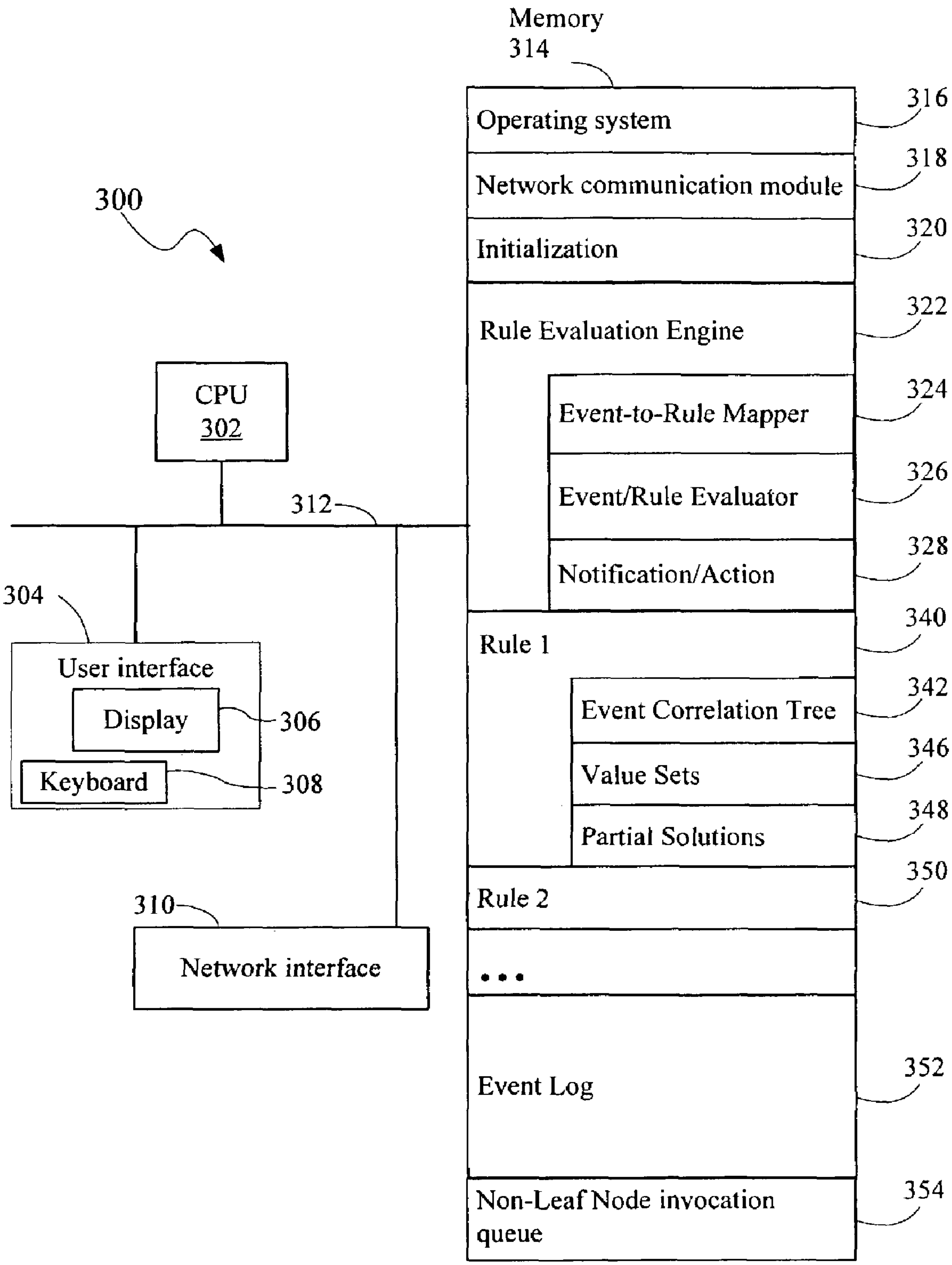
FIG. 3 is a block diagram of a network security monitor.

An event message generated by a security device, e.g., an intrusion detection sensor (IDS), is characterized by a set of event parameters that specify the details about the generation of an event. FIG. 2 is a diagram illustrating the data structure of an exemplary event message 200. A series of such event messages 200 may be stored in a network security monitor 300 (FIG. 3), for example is an event log 352 (FIG. 3). In one embodiment, each event message 200, when it is stored in the network security monitor includes the following parameters:

- Source address 210—the source network address of the packet involved in the intrusion, in other words, the address of the attacker;
- Source port 220—the port on the machine from which the intrusion was attempted;
- Destination address 230—the destination network address of the packet involved in the intrusion; in other words, the address of the attacked host;

- Destination port 240—the destination port that represents a service on the destination host;
- IP protocol 250—the IP protocol that was used; the protocol and destination port represent the service of the system being addressed, and thus may represent a service that is being attacked;
- Reporting Device ID 260—the identifier of the device reporting the event;
- Timestamp 270—the time at which the event happened;
- Event ID 280—a sequence identifier of this event; this identifier may be generated by the network security monitor (or alternately by the device generating the event message), and must uniquely identify the event message to the network security monitor; and
- Event Type 290—the type of packet or the type of security intrusion detected by the reporting device.

An event correlation rule specifies a set of event messages, including required relationships between the messages (e.g., time ordering constraints, shared source or destination addresses, and the like), that correspond to a type of security event, such as a particular type of attack or security breach. A typical security monitor will compare received even messages with a plurality of such event correlation rules, and in most implementations there will be numerous (e.g., more than ten, or more than one hundred) event correlation rules that must be evaluated simultaneously, in real time.

FIG. 3 illustrates a network security monitor 300 used for processing a stream of event messages 200. A network security monitor 300 typically comprises one or more central processing units (CPU's) 302, a network or other communications interface 310, memory 314, and one or more communication buses 312 for interconnecting the components of network security monitor 300. Network security monitor 300 may optionally include a user interface 304, for example, including a display 306 and a keyboard 308. Memory 314 includes high-speed random access memory and may also include non-volatile memory, such as one or more magnetic disk storage devices (not shown). Memory 314 may also include mass storage that is remotely located from the central processing unit(s) 302. Memory 314 preferably stores:

- an operating system 316 that includes procedures for handling various basic system services and for performing hardware dependent tasks;
- a network communication module 318 that is used for connecting monitor 300 to various security devices or client computers (not shown) and possibly to other servers or computers via one or more communication networks (wired or wireless), such as the Internet, other wide area networks, local area networks, metropolitan area networks, and so on;
- a system initialization module 320 that initializes other modules and data structures stored in memory 314 required for the appropriate operation of monitor 300;
- a rule evaluation engine module 322 for processing an incoming event message;
- a plurality of event correlation rules 340 and 350 designed for different attack scenarios; and
- an event log for storing event messages processed by monitor 300.

Rule evaluation engine module 322 includes executable procedures, sub-modules, and other data structures supporting the rule evaluation process. In one embodiment, the rule evaluation engine module includes:

- an event-to-rule mapping sub-module 324 that tries to associate an incoming event message with a rule stored in memory 314;

- an event/rule evaluator sub-module 326 that processes an incoming event message under a certain rule if the message has been associated with the rule; and
- a notification/action sub-module 328 for sending out an alert to network administrators if a certain rule has been completely satisfied by an incoming event message.

An event correlation rule 340 is designed for detecting one or several types of security attacks that follow a particular pattern. In another embodiment, each rule 340 is represented by certain data structures in memory 314 including:

- an event correlation tree of nodes 342 that has a plurality of leaf nodes, each accepting a particular kind of event message, and a plurality of non-leaf nodes correlating different event messages associated with different leaf nodes in a predetermined manner;
- a plurality of value sets 346 associated with different leaf nodes, each value set storing one or more event messages that share a unique combination of certain event parameter values; and
- a plurality of partial solutions 348, some associated with leaf and others associated with non-leaf nodes; the partial solutions are linked together starting from higher level nodes and proceeding toward the leaf-nodes.

Figure 1:
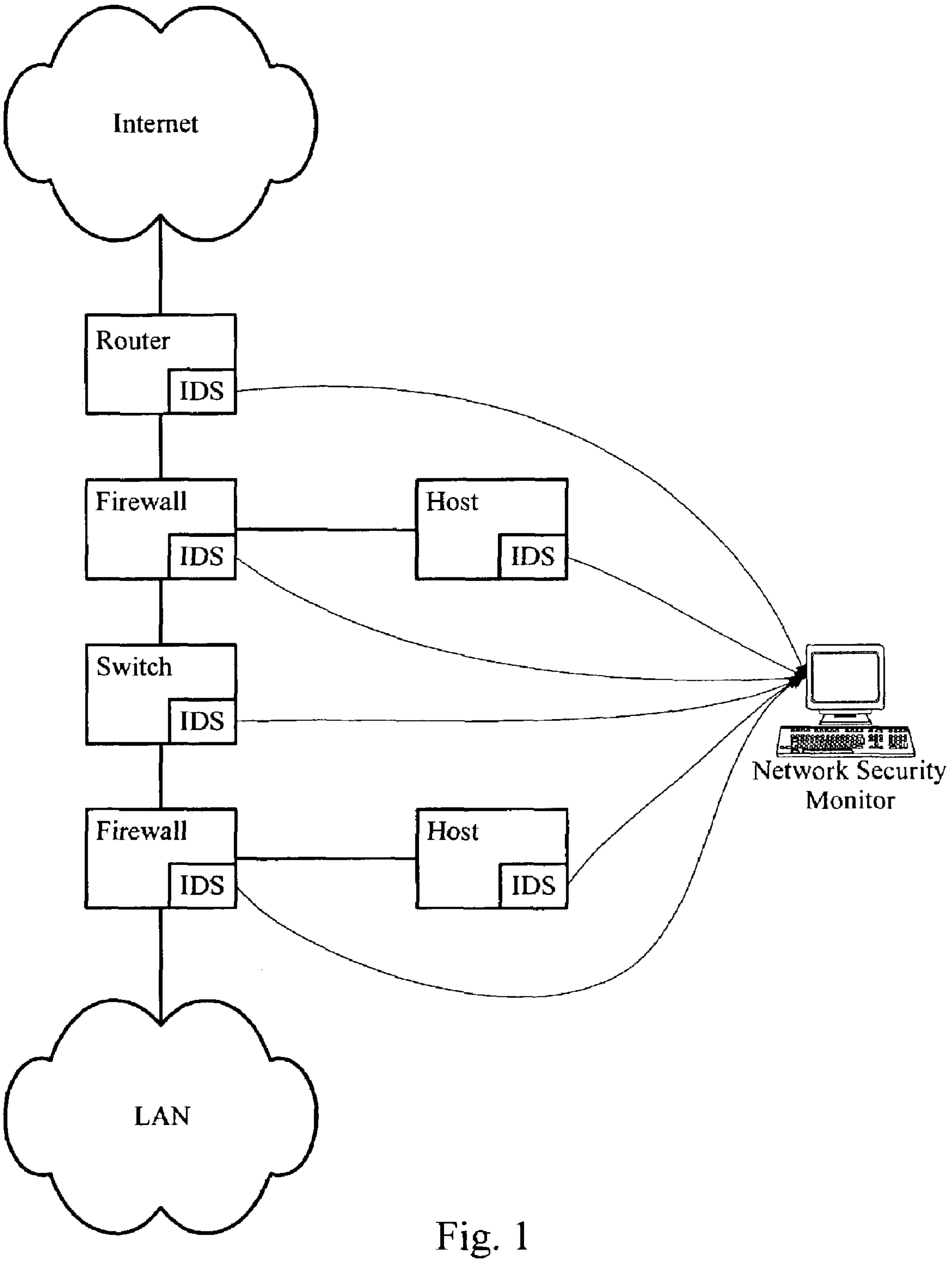
FIG. 1 illustrates a computer network emphasizing the collection of event messages from multiple security devices by a network security monitor.
Figure 4:
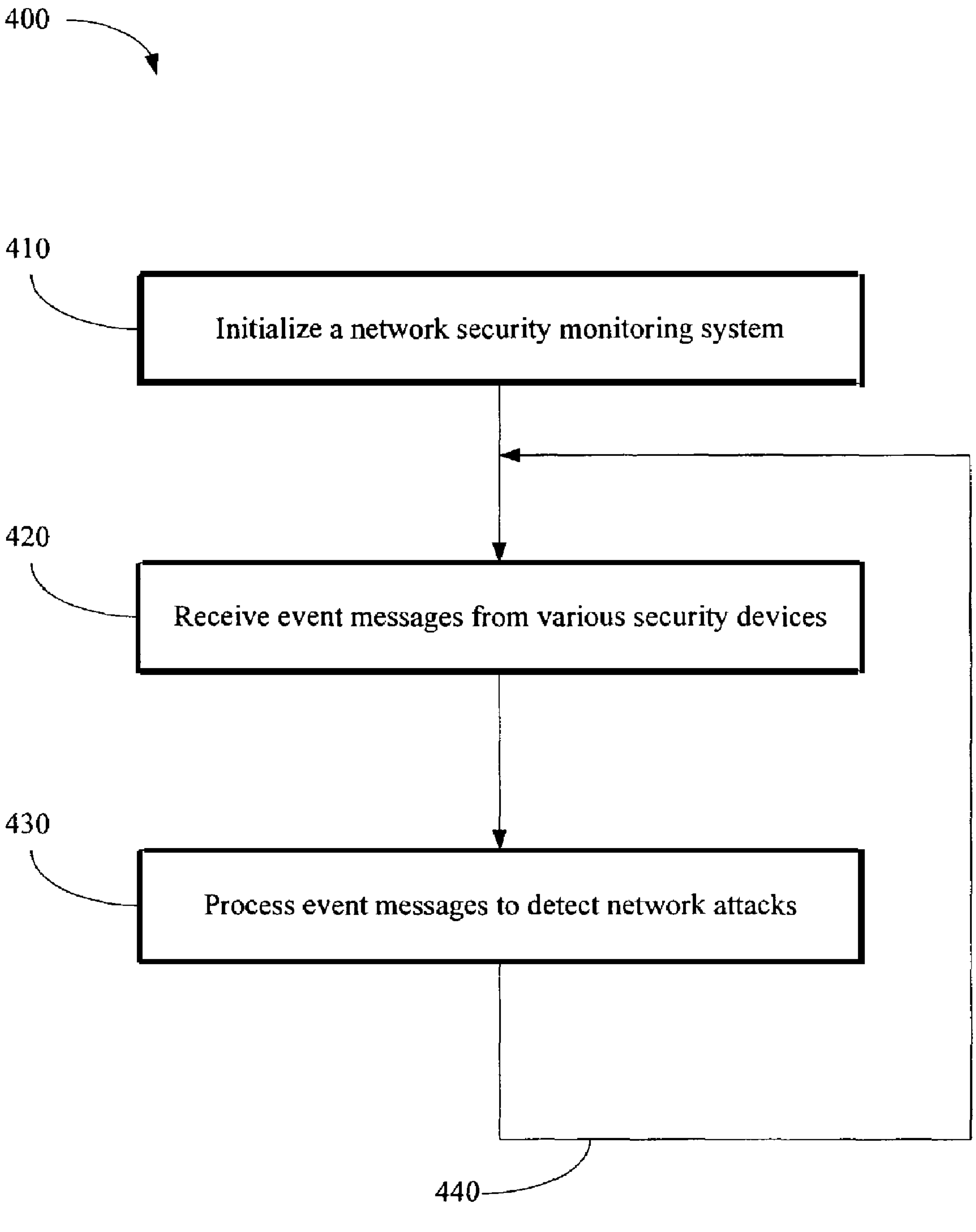
FIG. 4 is a flowchart demonstrating the major steps of the present invention.

A flowchart in FIG. 4 depicts three processes that illustrate the major operations of a network security monitoring system. In process 410, a system first goes through an initialization process. The initialization process is discussed in more detail below with reference to FIG. 5. In process 420, the system receives network-related event messages from various security devices deployed at different parts of a network as indicated in FIG. 1. In process 430, upon receiving a new event message, the system processes the message according to a set of predefined event correlation rules to unveil attacks against the network that the system is monitoring. As indicated in FIG. 4, processes 420 and 430 form a loop 440 such that the system is always ready for handling additional incoming event messages. More in-depth discussions about processes 420 and 430 are provided below with reference to FIGS. 6 and 7.

The core of the system initialization process 410 is to establish in memory an event correlation tree (also herein called a decision tree) and its associated data structures, e.g., value sets and partial solutions, in accordance with an event correlation rule. An event correlation rule can be represented by a Boolean function, a plurality of inter-event constraints associated with non-leaf nodes and a plurality of intra-event constraints associated with leaf nodes of the event correlation tree. Accordingly, the initialization process 410 breaks down into three distinct steps, as shown in FIG. 5.

In step 510, given an event correlation rule 340, a decision tree is generated in the memory 314 according to a Boolean function expression of the event correlation rule. The decision tree has a plurality of leaf nodes and a plurality of non-leaf nodes. The leaf nodes are used for storing incoming event messages that match those nodes. The non-leaf nodes are used for correlating different event messages and storing the relevant correlation results. Each non-leaf node may have a logical operator associated with it. Three kinds of logical operators, AND, OR, and AND_NOT, are available for use in the decision trees in one embodiment. For example, if an event correlation rule requires that two event messages should co-exist, an operator AND will be assigned to a non-leaf node whose child nodes are associated with the two event messages.

In step 520, an inter-event constraint $F_k()$ is assigned to a non-leaf node N, if this non-leaf node, but none of its child nodes, covers (i.e., is a parent of) all the leaf nodes required for complete evaluation of the inter-event constraint. An inter-event constraint usually has one or more types of event messages as its parameters in order to conduct an appropriate event correlation. Each leaf node is associated with a respective type of event messages. Therefore, given an inter-event constraint, it is easy to determine which leaf nodes and which non-leaf nodes are needed for supporting the complete evaluation of the constraint.

As discussed above, there is no event correlation at the leaf node level. Instead, an intra-event constraint is assigned to a leaf node M in step 530. An intra-event constraint associated with a leaf node stipulates what kind of event messages should be stored at the leaf node. For example, an intra-event constraint may require that all the event messages stored at a leaf node should have the same set of predefined event parameter values. For example the intra-event constraint for a leaf node may be that all the event messages must have specified event type or an event type that falls within a defined family or group of event types. In another example, an intra-event constraint may require a specified number of events of a particular event type having the same source address, or the same destination address, within a certain amount of time. Appropriate categorization of incoming event messages at leaf node level is important in reducing the system's workload.

As stated above, in process 420, the system receives network-related event messages from various security devices. Process 430, the processing of received event messages, is divided into two distinct stages, event message registration at leaf node level of a decision tree and event message correlation at non-leaf node level.

Figure 6:
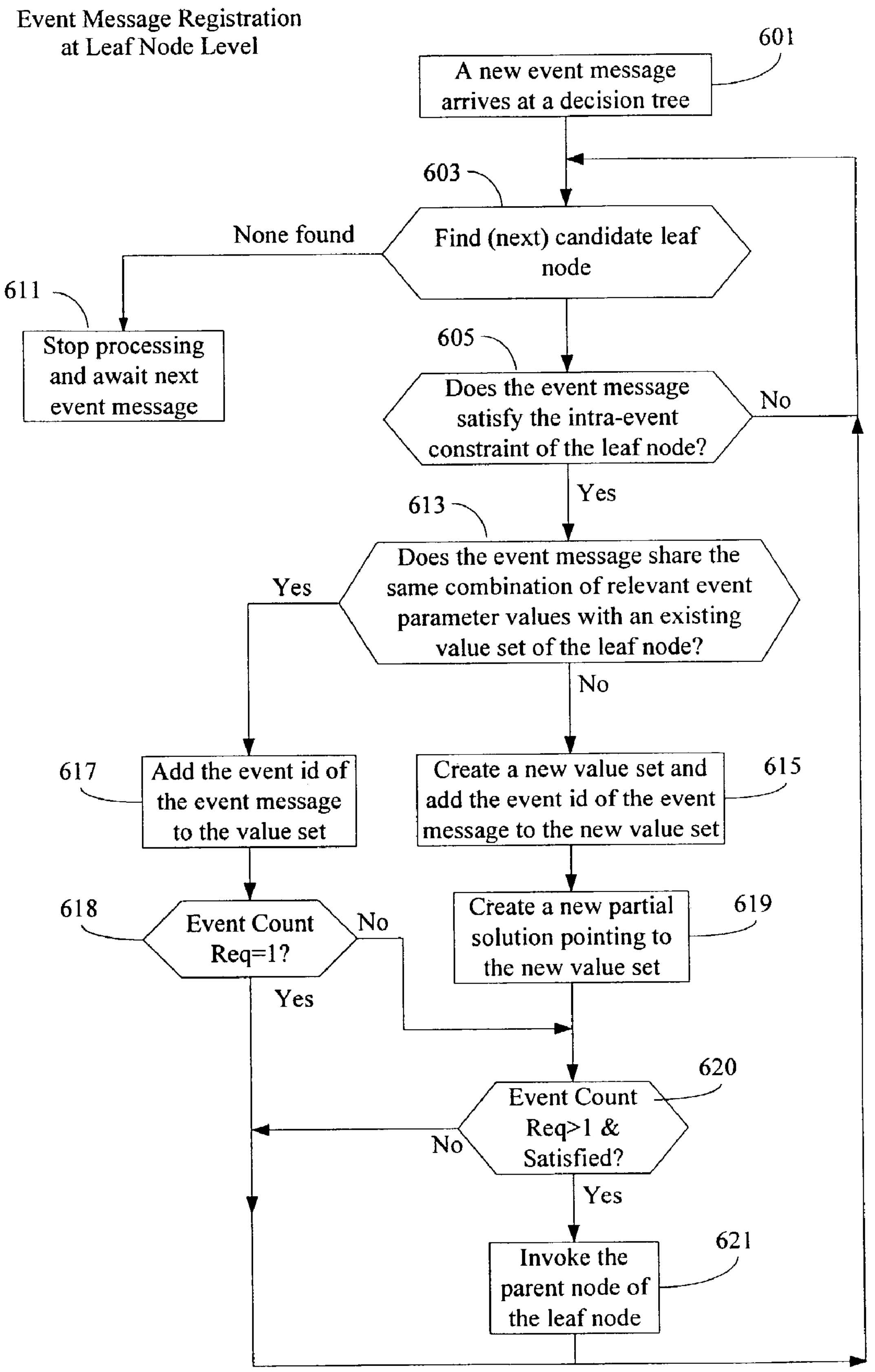
FIG. 6 is a flowchart illustrating the event processing at the leaf node level according to a preferred embodiment of the present invention.

FIG. 6 illustrates an event message registration process at the leaf node level of a decision tree. In step 601, a new event message is received by a network security monitoring system and arrives at a decision tree representing a predefined event correlation rule. In one embodiment, it is at this time that a unique event ID is assigned to the incoming event message, while in another embodiment the event message has already been assigned an unique event ID by the sender of the message.

In step 603, the process identifies a first next candidate leaf node (if any) for the event message. If step 603 is being performed a second or subsequent time for the same event message, step 603 identifies a next candidate leaf node (if any) for the event message. In one embodiment, the candidate leaf node(s) are those leaf nodes that are configured to process event messages of the same type as the incoming event message. In a second embodiment, the candidate leaf nodes include one or more leaf nodes that not only have an event type matching the incoming event message, but which also match one or more or additional attributes of the incoming event message. For instance, a leaf node may be configured to be a candidate only for event messages of type A that have a predefined source address. Another example would be a leaf node configured to be a candidate for event messages of event type B and having a destination address having a predefined prefix. In this second embodiment, some or all of the intra-event constraint checking that would otherwise be performed in step 605 (discussed below) is performed in step 603. If a candidate leaf node is identified in step 603, processing of the event message continues at step 605. Otherwise, the process skips to step 611, where it waits for a next event message to process.

In step 605, the event message is evaluated against the intra-event constraint of a leaf node of the tree. For instance, if the leaf node has an intra-event constraint accepting only messages having an event type of "Host Scan" and a specific predefined destination address, the process moves to step 613 if the new event message meets both of these requirements.

Otherwise, the process returns to step 603, where the process attempts to identify a next candidate leaf node for the event message being processed. If there are no additional candidate leaf nodes, the process stops further processing of the event message with respect to the correlation rule being processed and awaits next event message at step 611. If there is at least one additional candidate leaf node, processing of the event message continues at step 605 with respect to that candidate leaf node. With respect to step 611, it is noted that if there is at least one additional correlation rule stored in memory 314 for which the event message has not yet been processed, the event message is processed again by performing the same process (starting at step 601) with respect to another correlation rule.

If the new event message satisfies the intra-event constraint of a leaf node (605-Yes), the process moves to step 613. In step 613, the process checks the event parameters of the incoming message against value sets associated with the leaf node, if any. The checking result has two possibilities, either there is an existing value set that shares the same combination of relevant event parameter values as the incoming event message or there is no such value set.

In case of the first possibility (613-Yes), the process appends the event ID of the incoming message to the value set that shares the same combination of relevant event parameters (step 617). In some cases, a single event of a particular type is not a sufficient basis for invoking the evaluation of a rule. In such cases, the rule specifies a number of occurrences of the event type that must occur, generally within the time frame associated with a single value set, before rule evaluation is triggered. The specified number of occurrences is herein called an "event count" requirement. If the event count requirement for the leaf node currently being processed is 1 (618-Yes), and this is not the first message in the value set, i.e., it is not the first event message of its type received by the decision tree, there is no need for further action in response to this message. Therefore, the process moves to step 611 and awaits the next event message. If the event count requirement for this leaf node is greater than one (618-No), the process continues at step 620, described below.

If it turns out that no value set shares the same combination of relevant event parameters as the incoming message (613-No), the process will create a new value set, associate the new value set with the leaf node, and insert the event ID of the incoming message into the new value set (step 615). In step 619, the process also creates a new partial solution that contains a pointer to the new value set created in step 615. In other words, there is a one-to-one mapping between a partial solution and a value set at a leaf node. One leaf node can host multiple value sets as well as multiple partial solutions as long as each value set has a unique combination of relevant event parameter values.

As noted above, in some cases, a single event of a particular type is not a sufficient basis for invoking the evaluation of a rule. After step 619, therefore, the leaf node evaluation process checks to see if the required number of events (of the event type associated with the leaf node) have been received and stored in the value set (step 620). If the event count requirement has not been met (or if the event count requirement is equal to 1), then processing stops at step 611, to await the arrival and processing of a next event message. If the event count requirement is greater than one and has been satisfied by the arrival of the event message being processed (620-Yes), then in step 621 the leaf node invokes its parent node such that this incoming event message will be correlated with other event messages that previously registered at other leaf nodes, in order to detect the existence of a high-level network attack.

In one embodiment, the parent node invoking step 621 does not cause the parent node to be immediately invoked. Rather, invocations of non-leaf nodes by leaf nodes are deferred for short periods of time and are then processed in a batch. Deferred invocations may be indicated, for example, by setting a flag in each value set requiring evaluation by a non-leaf node. Alternately, a queue structure or a bit map of non-leaf nodes may be used to keep track of which non-leaf nodes require invocation. All deferred non-leaf invocations are processed periodically, such as once per second, once per five seconds or possibly as long as once per ten seconds. Each non-leaf node evaluation period may be called an "evaluation tick " or an "evaluation period." An advantage of deferring and then batch processing the non-leaf node invocations is that all the event messages that have arrived since the last evaluation period are evaluated at once. This improves memory usage, since the decision tree will be more fully populated with events to evaluate, and all the nodes of the decision tree can be brought into memory once per evaluation period.

Figure 7:
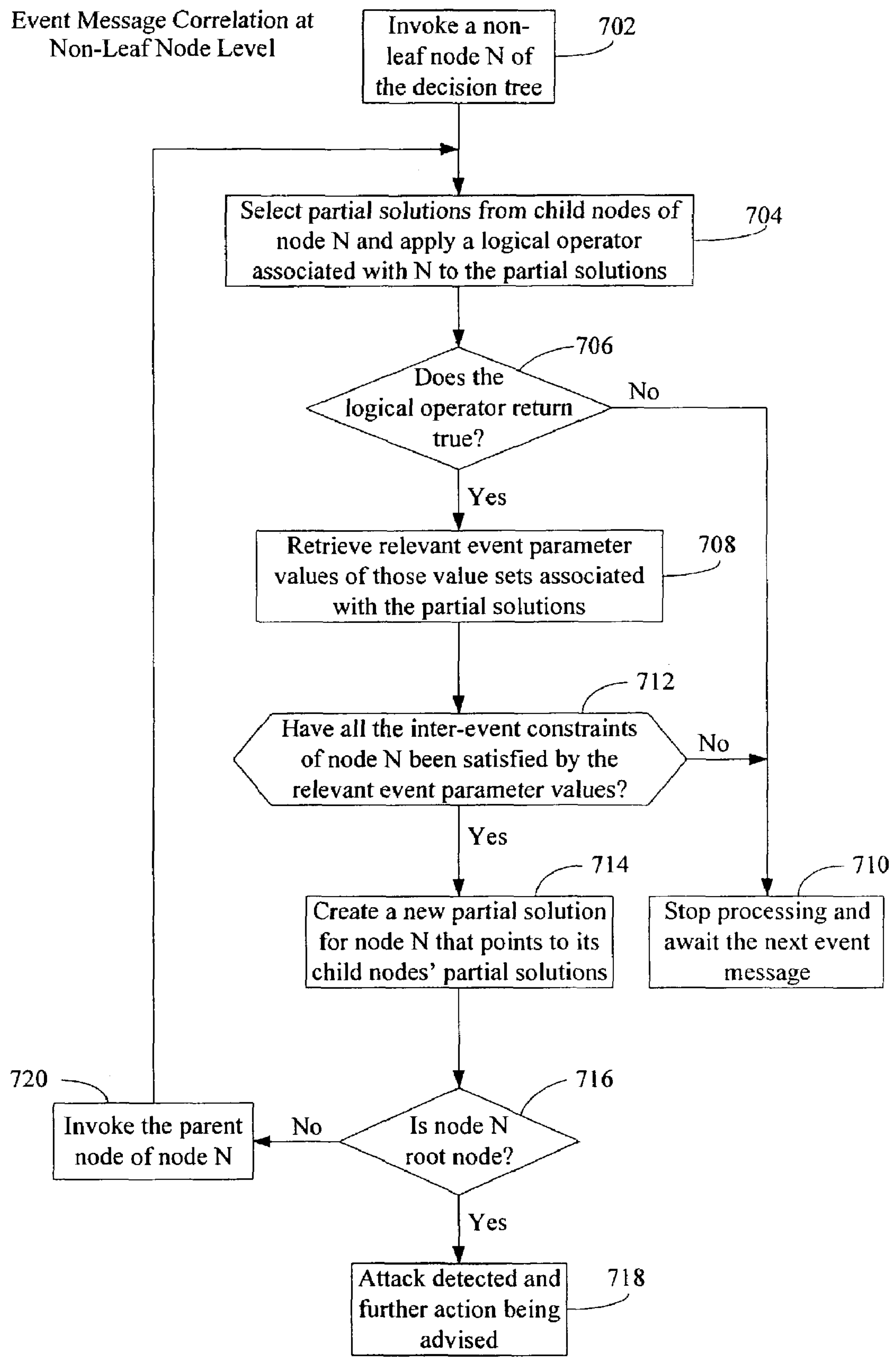
FIG. 7 is a flowchart illustrating the event processing at the non-leaf node level according to the preferred embodiment of the present invention.

For the same embodiment as the one shown in FIG. 6, FIG. 7 illustrates an event message correlation process at a non-leaf node N, which can be a non-leaf node serving as a parent of a leaf node, or a non-leaf node serving as a parent of another non-leaf node. The non-leaf node N may be the root node of the decision tree for a particular correlation rule.

In step 702, the non-leaf node N is invoked by one of its child nodes, after the child node generates a new partial solution in response to a new event message.

In step 704, the non-leaf node N selects partial solutions associated with its child nodes, e.g., one partial solution from each child node, and then applies its associated logical operator to the partial solutions collected from those child nodes. More specifically, the non-leaf node N selects all combinations of partial solutions from its child nodes that have not previously been processed by the node. In some cases, the new combinations of partial solutions will be formed by a new partial solution in one child node in combination (one at a time) with each of the partial solutions in another child node. Application of the logical operator to these combinations determines whether there are any combinations of partial solutions not previously evaluated by the node that are suitable for evaluation with respect to the inter-event constraint for this node.

In step 706, the logical operator returns a value, TRUE or FALSE. If the logical operator returns a value of FALSE (706-No), there are no combinations of partial solutions at the child nodes (excluding ones previously considered during prior invocations of the node) to support an inter-event correlation at node N. In this case, the process will stop and await (at step 710) a next invocation of the node, triggered by a next incoming event message. If the result of step 706 is TRUE, there is at least one set of partial solutions at the child nodes to support an inter-event correlation.

In step 708, node N first traverses down the decision tree to a value set through a chain of partial solutions starting from a partial solution associated with one child node of N and then retrieves a combination of relevant event parameter values associated with that value set. This procedure repeats itself for every child node's partial solution and produces multiple sets of relevant event parameter values in association with node N.

In step 712, node N applies each set of relevant event parameter values collected by step 708 to its inter-event constraints. More specifically, there can be zero, one or more than one inter-event constraints in association with a non-leaf node, depending on how the event correlation rule is defined. Only if all the inter-event constraints (for the current node being processed) satisfied by a set of relevant event parameter values, the process can move to step 714. Otherwise, the process will move to step 710 where processing for node N stops and awaits a next invocation of the node, triggered by a next incoming event message.

In step 714, for each set of relevant event parameter values that have satisfied all the inter-event constraints associated with the current node (node N), node N creates a partial solution that points to a corresponding set of partial solutions at its child node level. If there are multiple sets of relevant event parameter values passing the test of step 712, node N creates and stores multiple partial solutions in associated with node N.

Finally, in step 716, the process checks if node N is the root node of the decision tree. If node N happens to be the root node, it means that a network attack has been detected and certain one or more protective actions should be taken in step 718, described in more detail below. If node N is not the root node, and thus is an ordinary non-leaf node, the process moves to step 720 where node N invokes its own parent node. The non-leaf node processing then continues with the invoked parent node (i.e., at the next higher. level in the decision tree). Thus step 720 may be considered to a recursive procedure call on the procedure for processing new partial solutions at a non-leaf node. In one embodiment, the invocation of a parent node by a non-leaf node is processed with high priority, and thus is not deferred (unlike the deferred processing of non-leaf node invocations by leaf nodes, discussed above).

Figure 8:
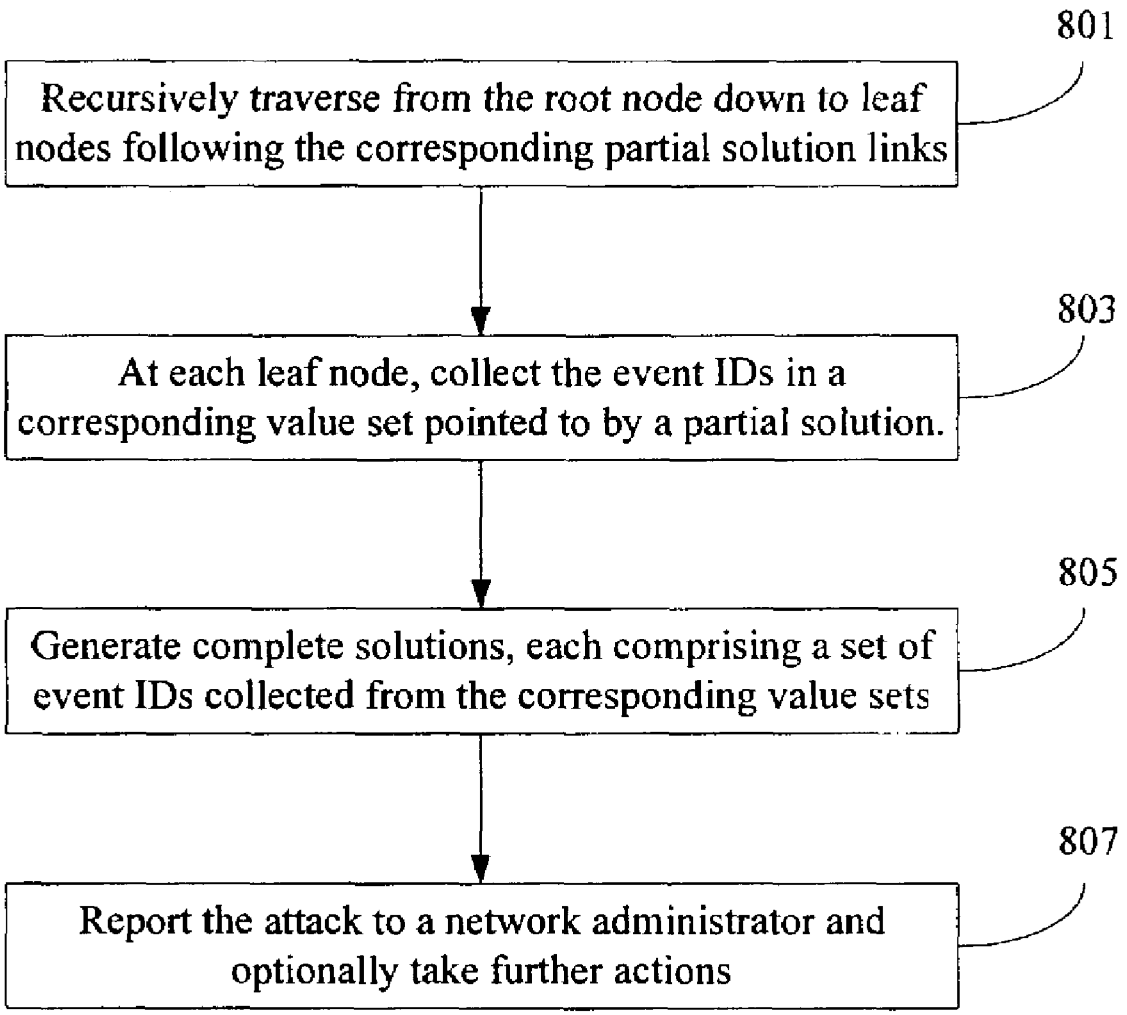
FIG. 8 is a flowchart illustrating the generation of a complete solution at the root node according to the preferred embodiment of the present invention.

FIG. 8 corresponds to step 718 of FIG. 7, and represents processing performed by the root node once a set of events satisfying the entire rule has been identified. In step 801 of FIG. 8, similar to step 708, the root node traverses down to a leaf node through a chain of partial solutions, starting at a partial solution associated with the root node.

In step 803, at the leaf node, the process visits the value set corresponding to the partial solution chain and retrieves all the event IDs stored in this value set. This process visits every leaf node related with the partial solution at the root node and gathers event IDs from every related value set. If the root node has multiple partial solutions, as is typically the case, steps 801 and 803 will repeat multiple times.

In step 805, for each partial solution associated with the root node, the process generates a complete solution that comprises a set of event IDs collected from the corresponding value sets. Multiple partial solutions at the root node will produce multiple complete solutions.

In step 807, the process reports the complete solutions to a network administrator or another higher-level system. Optionally, the process may conduct an analysis of the complete solutions and take further protective actions in accordance with the results of that analysis.

FIGS. 9A-9H present an example. Suppose that we want to specify a high-level event correlation rule R involving the following four types of events:

Host scan event from any host to any host OR

Port scan event from any host to any host FOLLOWED BY (in time)

RPC Buffer overflow to an attacked host FOLLOWED BY (in time)

Outbound FTP session started from the attacked host.

Each event type can be represented by an intra-event constraint at leaf node level. Recalling that for an FTP session, the destination port is 21 and the IP protocol is TCP, the four intra-event constraints here are:

Ev1: {Event Type="Host scan"};

Ev2: {Event Type="Port scan"};

Ev3: {Event Type="RPC Buffer overflow"}; and

Ev4: {Destination port=21, IP protocol="TCP", Event Type ="TCP Session Start"}).

As a result, the event correlation rule R is equivalent to a Boolean function representing the event-level correlation BF(Ev1, Ev2, Ev3, Ev4)=(Ev1 OR Ev2) AND Ev3 AND Ev4, and a plurality of inter-event constraints F1 (Ev1, Ev2, Ev3)=TRUE if (Timestamp of e3>max (Timestamp of e1, Timestamp of e2)), for event messages e1 in Ev1, e2 in Ev2 and e3 in Ev3, F2(Ev3, Ev4) TRUE if (Timestamp of e4>Timestamp of e3), for events e3 in Ev3, e4 in Ev4, and F3(Ev3, Ev4)=TRUE if (Destination Address of e3=Source Address of e4), for events e3 in Ev3, e4 in Ev4, and the plurality of intra-event constraints Ev1-Ev4 specified above.

Figure 9A:
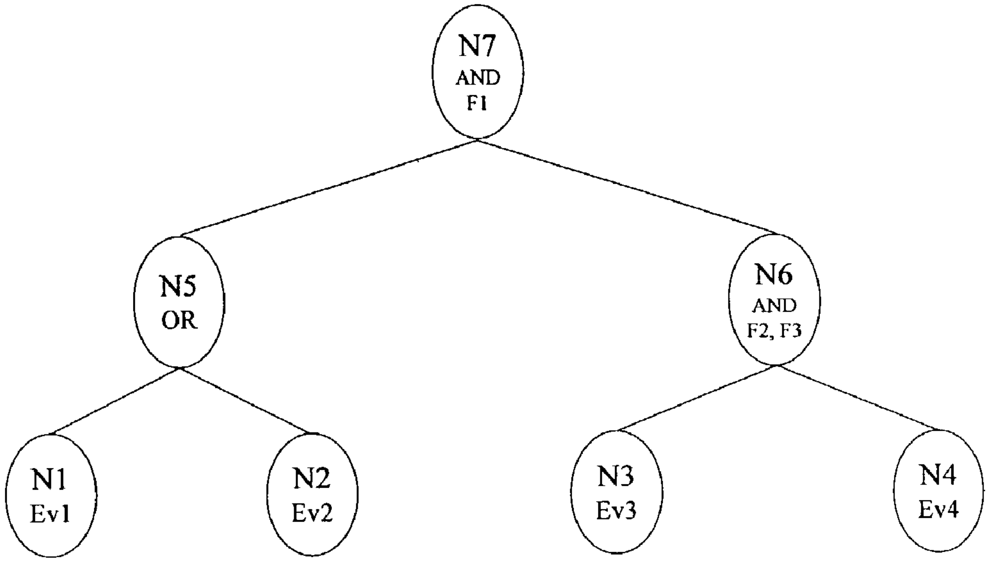
FIG. 9A illustrates a tree of nodes and associated intra-event and inter-event constraints after initialization.

FIG. 9A depicts a decision tree, including four leaf nodes N1-N4, two intermediate non-leaf nodes N5 and N6, and one root node N7. Accordingly, event type Ev1 is associated with node N1, Ev2 with N2, Ev3 with N3, and Ev4 with N4. Furthermore, node N5 is associated with a logical OR, N6 and N7 with a logical AND. The criterion of associating an inter-event constraint with a non-leaf node is that a sub-tree rooted at the non-leaf node, but not any of its sub-sub-trees, includes every leaf node associated the event types required by the inter-event constraint. For example, F1 requires three event types, Ev1, Ev2, and Ev3. Obviously, N7, as the root node, is associated with all the four even types. However, N5 is only associated with Ev1 and Ev2 and N6 is with Ev3 and Ev4. Therefore, F1 is an inter-event constraint associated with N7. Similarly, F2 and F3 are associated with N6 and N5 has no inter-event constraint.

Next described is an example of the operation of the above described embodiment. In this example, seven messages arrive at the decision tree at different times, each having a set of unique event parameter values listed in Table I. In Table I, the parameter value "N/A" indicates that the parameter is irrelevant in the event correlation process. In general, these parameters will have specific values, but those values are not relevant for this example.

TABLE I

Event parameter values of seven messages.

| Event Message | Event ID | Source Address | Destination Address | Time stamp | Event Type | Destination Port | IP Protocol |
|---|---|---|---|---|---|---|---|
| M1 | 1 | 10 | 20 | 1 | Host Scan | N/A | N/A |
| M2 | 2 | 10 | 20 | 2 | Host Scan | N/A | N/A |
| M3 | 3 | 12 | 22 | 2 | Host Scan | N/A | N/A |

TABLE I-continued

Event parameter values of seven messages.

| Event Message | Event ID | Source Address | Destination Address | Time stamp | Event Type | Destination Port | IP Protocol |
|---|---|---|---|---|---|---|---|
| M4 | 4 | 12 | 20 | 3 | Sendmail Buffer Overflow | N/A | N/A |
| M5 | 5 | 10 | 20 | 4 | RPC Buffer Overflow | N/A | N/A |
| M6 | 6 | 12 | 22 | 5 | RPC Buffer Overflow | N/A | N/A |
| M7 | 7 | 20 | 10 | 6 | TCP Session Started | 21 | TCP |

Figure 9B:
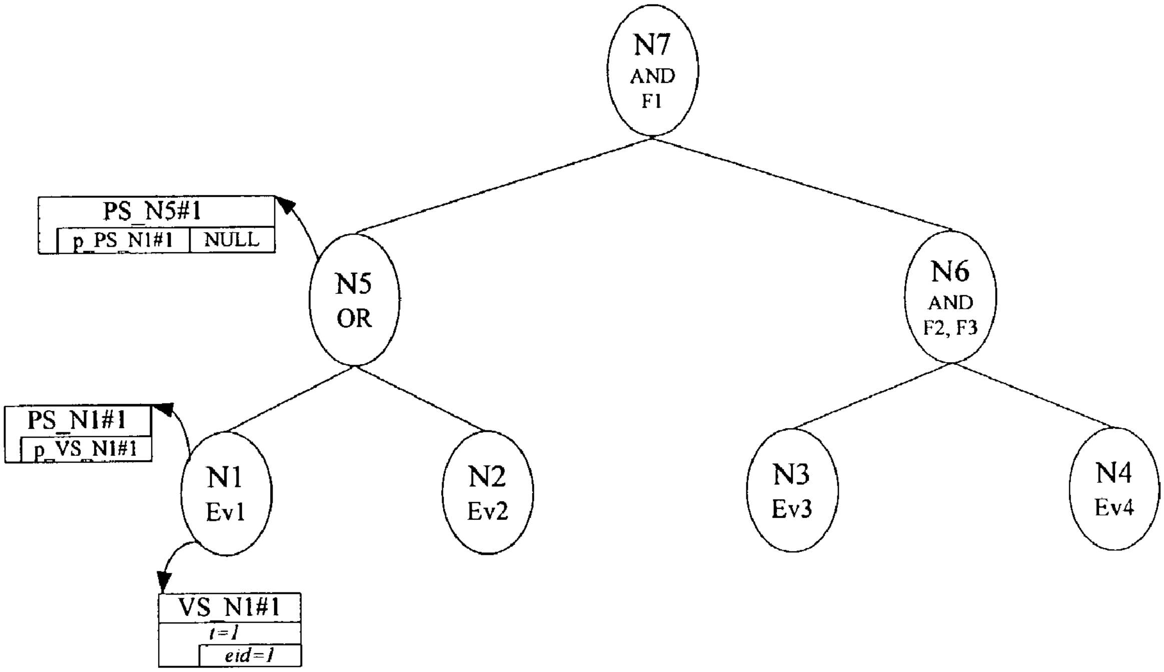
FIG. 9B illustrates a tree of nodes and associated data structures in response to the arrival of event message $e_1$ at leaf node $N_1$.

FIG. 9B illustrates the event correlation process upon arrival (at the network security monitor) of the first message M1 whose event ID equals to 1. Since node N1 accepts event message with an event type of "Host Scan" and M1's event type is "Host Scan", message M1 will be registered at node N1. The registration process includes creating a new value set VS_N1#1 hosting M1 since node N1 does not have any value sets yet, and creating a new partial solution PS_N1#1 that has a pointer, p_VS_N1 #1, pointing to value set VS_N1#1. Node N1 has only one relevant event parameter, Timestamp t, since it is the only parameter from Ev1 used in any inter-event constraint, i.e., F1 in the present case. Therefore, the event messages registered at node N1 will be stored in different value sets associated with different Timestamp values. The Timestamp value for each distinct value set may have a "coarse" granularity. For example, all Host Scan events whose timestamps have the same date, hour, minute and second may be stored in the same value set, even though their fractional second values are different. In another example, the least significant bit or two bits of the second value, and all less significant bits of the event timestamps may be masked out for purposes of allocating Host Scan events to value sets.

After creating partial solution PS_N1#1, node N1 invokes its parent node N5. N5 first collects partial solutions from its two child nodes N1 and N2, and then applies its logical operator OR to the partial solutions. Since N2 does not have any partial solution, it returns NULL value. A pair of partial solutions (PS_N1#1, NULL) obviously satisfy the logical operator OR at N5. Since N5 has no associated inter-event constraint, a new partial solution, PS_N5#1, is created and associated with node N5. PS_N5#1 includes one pointer, p_PS_N1#l, pointing to N1's partial solution PS_N1#1 and one NULL value indicating no partial solution from N2.

After the creation of PS_N5#1, node N5 invokes its parent node N7. Similarly, node N7 collects partial solutions from its two child nodes N5 and N6. Since node N6 does not have any partial solution, it returns NULL value, which inevitably fails the logical AND operator associated with node N7. As a result, the event correlation process stops at node N7 and waits for next incoming event messages.

Figure 9C:
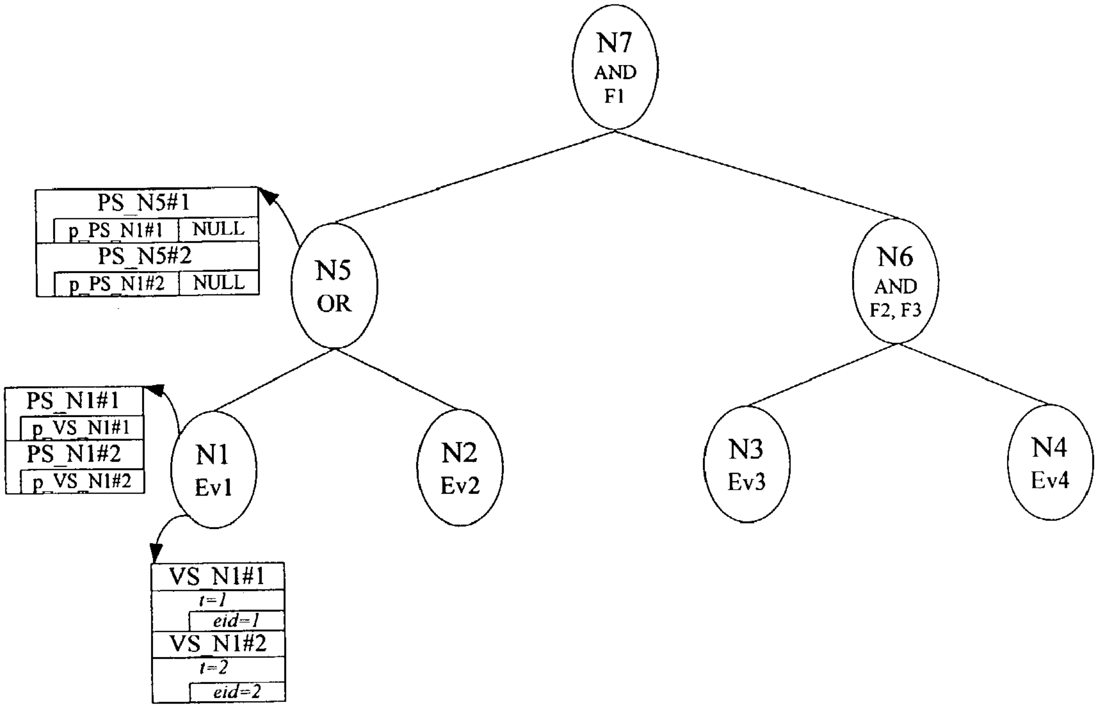
FIG. 9C illustrates the tree of nodes and associated data structures in response to the arrival of event message $e_2$ at leaf node $N_1$.

FIG. 9C illustrates the event correlation process upon arrival of the second message M2. Since M2's event type is also "Host Scan", it will be registered at N1 again. In this case, N1 first compares M2's timestamp value 2 with the existing value set VS_N1#l's timestamp value 1. Since they are different, a new value set VS_N1#2 and a new partial solution PS_N1#2 are created accordingly. Node N1 repeats the same invoking procedure as before and in response, node N5 generates a new partial solution PS_N5#2 and then invokes node N7. Since there is no partial solution support from node N6, the process once again stops at node N7.

Figure 9D:
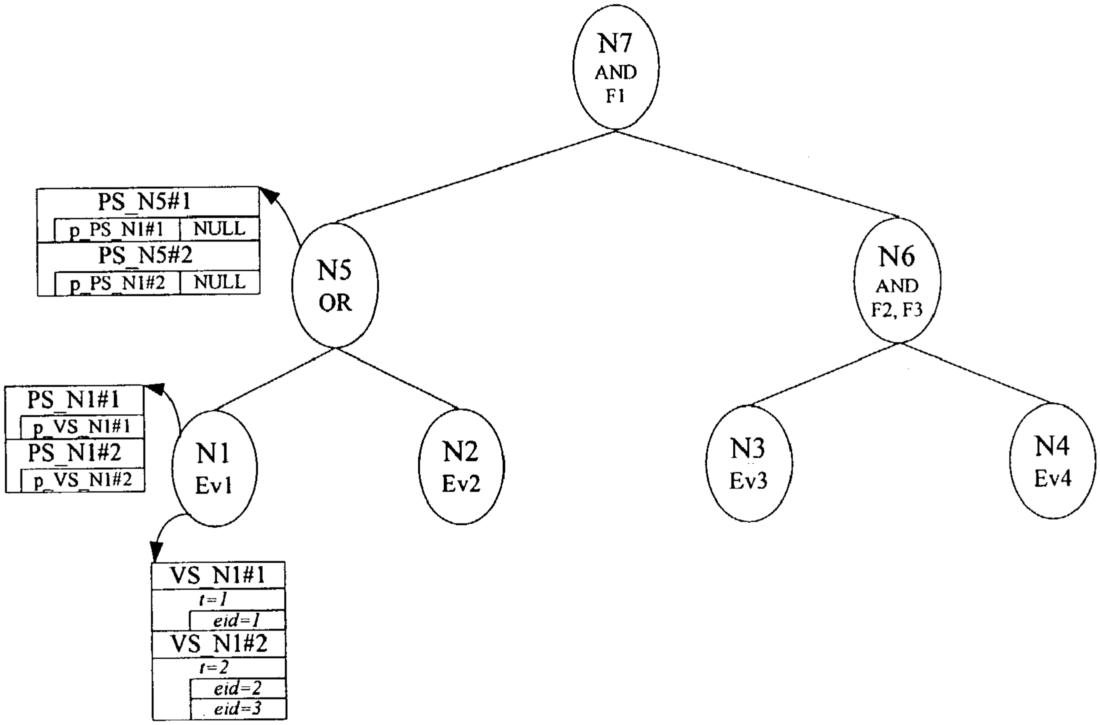
FIG. 9D illustrates the tree of nodes and associated data structures in response to the arrival of event message $e_3$ at leaf node $N_1$.

In FIG. 9D, event message M3 arrives at the network security monitor where it processed by the event/rule evaluator 326 (FIG. 3) using the depicted decision tree. M3's event type is also "Host Scan". Since its timestamp value is the same as VS_N1#2's timestamp value, node N1 appends M3's event ID to VS_N1#2. There is no need to generate a new partial solution in this case. Without new partial solution generation, the process stops at node N1.

Figure 9E:
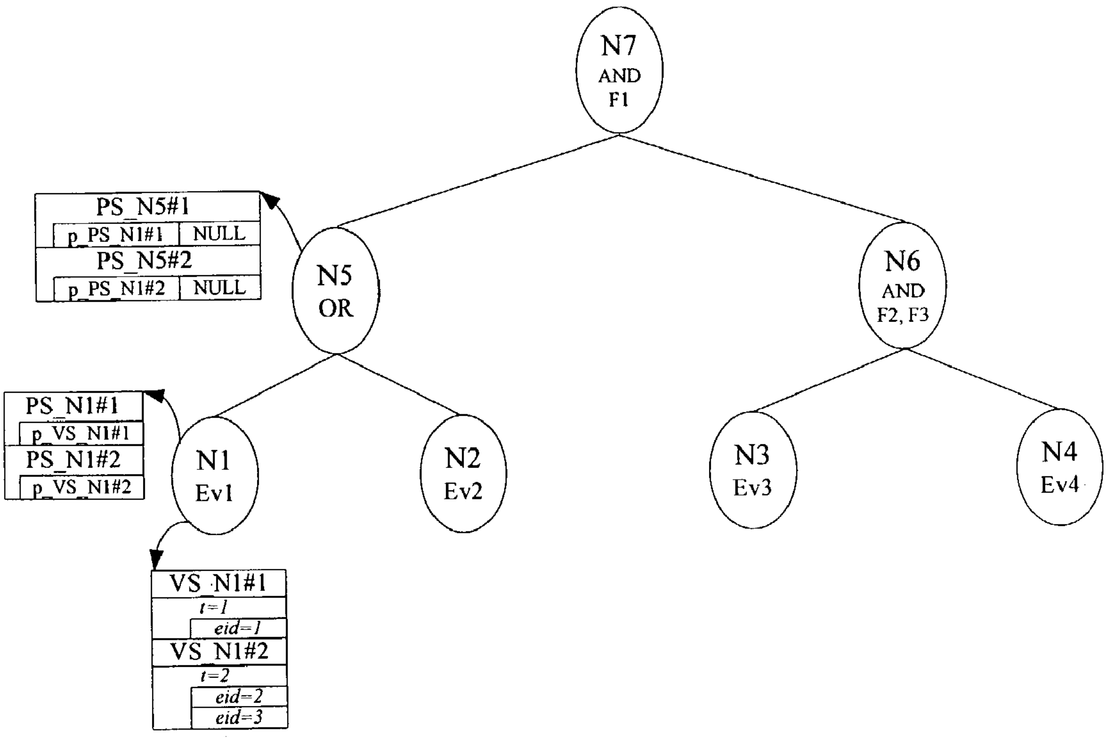
FIG. 9E illustrates the tree of nodes and associated data structures in response to the arrival of event message $e_4$.

In FIG. 9E, message M4 arrives at the network security monitor for processing using the depicted decision tree. Since its event type "Sendmail Buffer Overflow" does not satisfy any leaf node's intra-event constraint, no further action is necessary and the tree structure remains uninvoked.

Figure 9F:
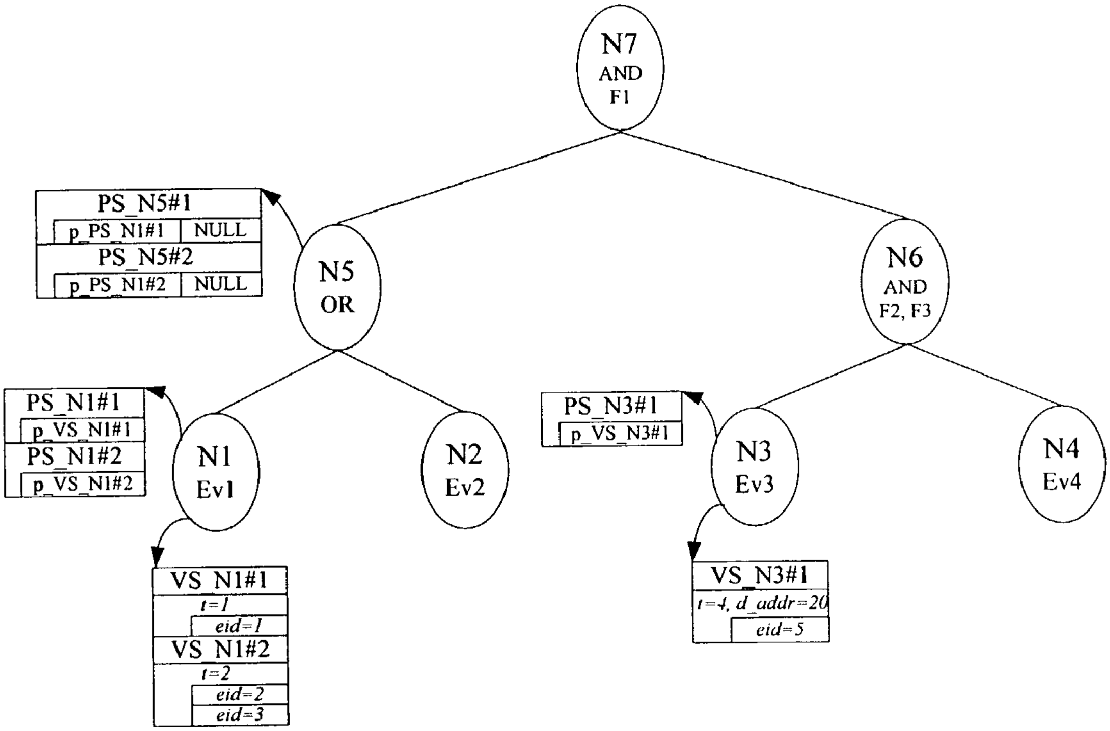
FIG. 9F illustrates the tree of nodes and associated data structures in response to the arrival of event message $e_5$ at leaf node $N_3$.

In FIG. 9F, message M5 arrives at the network security monitor. M5's event type "RPC Buffer Overflow" satisfies the intra-event constraint at leaf node N3 and a new value set VS_N3#1 and partial solution PS_N3#1 are created in response to M5's arrival. Since Ev3 has two parameters, timestamp and destination address, involved in inter-event constraints F1, F2, and F3 respectively, each value set associated with node N3 has two relevant event parameters and the incoming messages are inserted into different value sets with different combinations of timestamp and destination address. For example, VS_N3#1 contains all the "RPC Buffer Overflow" messages with timestamp equal to 4 and destination address equal to 20. After creating the value set and partial solution, node N3 invokes node N6 for further correlation evaluation. However, since there is no partial solution at node N4, the process stops at node N6.

Figure 9G:
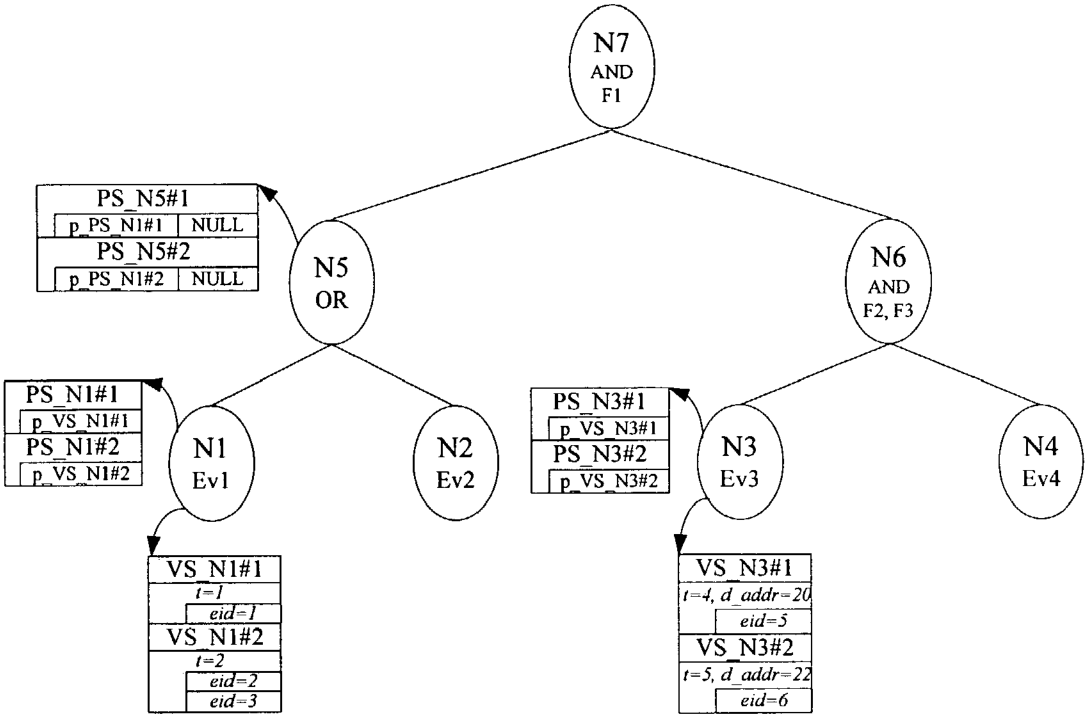
FIG. 9G illustrates the tree of nodes and associated data structures in response to the arrival of event message $e_6$ at leaf node $N_3$.

In FIG. 9G, message M6, which has the same event type as message M5, is registered at mode N3. Since M6 has a different combination of timestamp and destination address from M5, a new value set VS_N3#2 and partial solution PS_N3#2 are created accordingly. Similarly, the process stops at node N6 because there are no partial solutions at node N4.

Figure 9H:
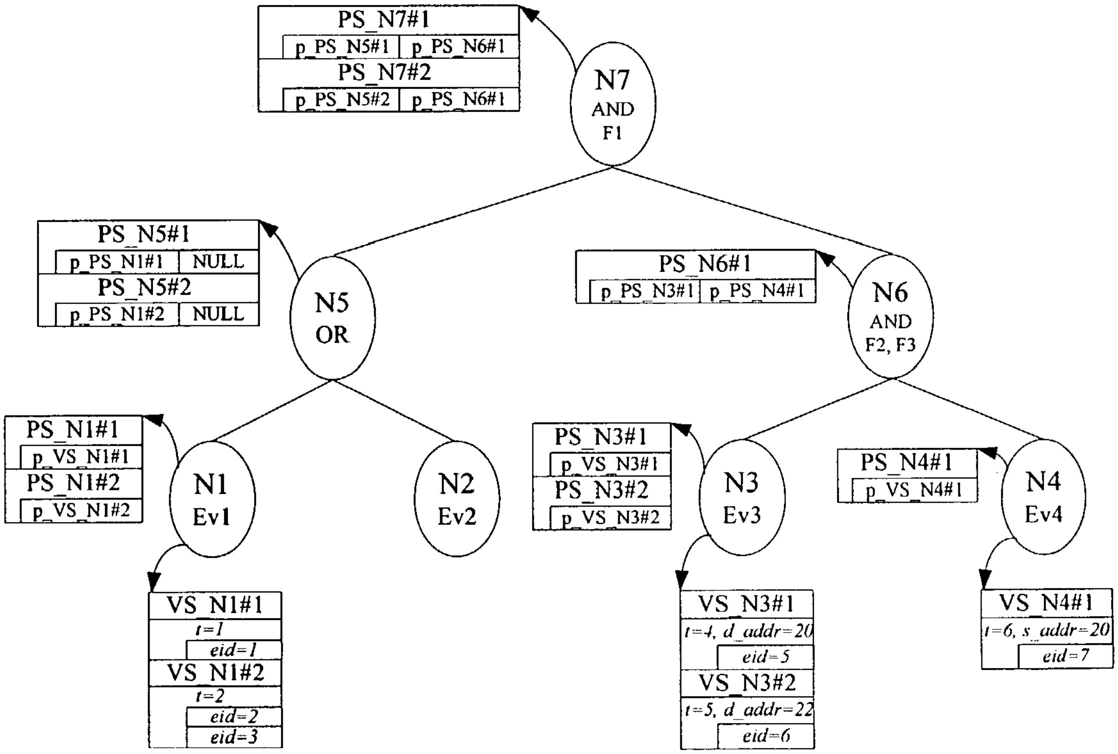
FIG. 9H illustrates the tree of nodes and associated data structures in response to the arrival of event message $e_7$ at leaf node $N_4$.

In FIG. 9H, message M7 arrives for processing by the network security monitor. M7's event parameters satisfy the intra-event constraint at node N4. Since node N4's relevant event parameters are timestamp and source address, a new value set VS_N4#1 is created using M7's timestamp and source address and M7 is inserted into VS_N4#1. After creating partial solution PS_N4#1 having a pointer to VS_N4#1, node N4 invokes its parent node, N6.

Node N6 first collects partial solutions from its children nodes N3 and N4, forming two partial solution pointer pairs (p_PS_N3#1, p_PS_N4#1) and (p_PS_N3#2, p_PS_N4#1). Both pairs satisfy the logical AND at N6. The next step is to evaluate each pair against the inter-event constraints F2 and F3. Since F2 and F3 compare different events' parameter values, node N6 traverses down to nodes N3 and N4 in order to retrieve each involved message's parameter values.

For example, given a partial solution pointer pair (p_PS_N3#1, p_PS_N4#1), the process starts with pointer p_PS_N3#1 and gets partial solution PS_N3#1 associated with N3. From PS_N3#1, the process acquires p_VS N3#1 pointing to value set VS_N3#1. Following this link, the process retrieves the value set's relevant parameters, timestamp=4 and destination address=20. Similarly, following the other partial solution pointer p_PS_N4#1, the process retrieves another set of relevant event parameters at node N4, timestamp=6 and source address=20. Since the timestamp=6 at VS_N4#1 is greater than the timestamp=4 at VS_N3#1 and the source address=20 at VS_N4#1 is the same as the destination address=20 at VS_N3#1, both constraints F2 and F3 are satisfied. Therefore, a new partial solution PS_N6#1 comprising the first pair of partial solution pointers is created at node N6. However, the second partial solution pointer pair (p_PS_N3#2, p_PS_N4#1) fails to satisfy the inter-event constraint F3, since VS_N3#2's destination address is 22 and VS_N4#1's source address is 20.

After creating a new partial solution PS_N6#1, N6 invokes its parent node N7. Node N7 repeats the same process as node N6 did in order to create new partial solutions. Since node N5 already stores two partial solutions PS_N5#1 and PS_N5#2 (see FIGS. 9B and 9D), the process does not need to re-build them in order to satisfy the logical AND of node N7, and thus avoids a substantially large computational cost. However, in order to evaluate the inter-event constraint F1, the process still needs to visit corresponding value sets at the leaf node level and retrieve relevant event parameter values associated with those value sets, similar to what node N6 did in FIG. 9G.

An advantage of using value sets here is that, since each value set may comprise multiple events that share the same relevant event parameter values, the computational cost of evaluating constraint F1 is proportional to the number of value sets, not to the number of event messages assigned to those value sets. For instance, value set VS_N1#2 comprises two event messages, event ID=2 and event ID=3, having the same timestamp value 2. When evaluating F1, only the timestamp value 2 from VS_N1#2 is necessary. As a result, two new partial solutions PS_N7#1 and PS_N7#2 are created at node N7.

Since node N7 is the root node of the decision tree, each partial solution associated with the root node is a complete solution for the correlation rule R, which each complete solution representing a possible attack on the network. Starting with each partial solution at the root node and following the corresponding partial solution links, the process traverses down to the leaf nodes to access the value sets for the partial solution, retrieves the event IDs stored in the value sets, and assembles all the event IDs from the value sets together into a complete solution.

For example, starting from PS_N7#1 and following its partial solution pointer p_PS_N5#1, the process will reach value set VS_N1#1 and acquire event ID 1. Following the other partial solution pointer p_PS_N6#1, the process collects event ID 5 from N3 and event ID 7 from N4. A set of event IDs {1, 5, 7} is a complete solution to the event correlation rule R. Another complete solution {2, 3, 5, 7} can be achieved similarly starting with another partial solution PS_N7#2 at N7. Note that event IDs, being unique, are sufficient for tracking down and finding details about those events. Optionally, a predefined counter-attack process can be invoked to protect the network from further damage.

Generally, tree structures such as the decision tree described above, are graph structures that have no cycles. In an alternate embodiment, the tree structure of the decision tree for one or more of the correlation rules is replaced by a hierarchically arranged graph structure, also known as an N-partite graph, in which two or more non-leaf nodes in the graph share a parent leaf node. This structure is herein called a decision graph. The decision graph has a hierarchical structure, with its nodes divided into tiers. The root node is alone in a top tier, the leaf nodes are in a bottom tier, and the non-leaf nodes other than the root node are arranged in one or more intermediate tiers of the decision graph. As an optimization, when a decision graph includes two or more identical leaf nodes, that set of leaf nodes is replaced by a single leaf node, and appropriate pointers are stored to link that one leaf node to multiple parent non-leaf nodes. This optimization, which requires a number of minor data structure and processing changes, reduces leaf-node processing of incoming messages. This can be important when the rate of incoming event messages is very high and there are multiple leaf nodes having identical event types within a correlation rule. As before, processing of correlation rules is segmented so as to enable efficient processing of portions or branches of each correlation rule as event messages are received. Also, as before, partial results are generated for each correlation rule for which at least one relevant event message is received, and combinations of those partial results are evaluated when appropriate.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing event messages, comprising:

defining a graph of nodes, including a plurality of leaf nodes, a plurality of non-leaf nodes;

receiving a stream of event messages, each event message characterized by a plurality of event parameters;

for each event message, identifying leaf nodes, if any, that correspond to the event message, and for each identified leaf node, storing in association with the identified leaf node a partial solution identifying the event message; and at predefined times, invoking each of a plurality of non-leaf nodes, wherein invoking a non-leaf node comprises evaluating an inter-event constraint associated with the non-leaf node utilizing the partial solutions stored for one or more nodes lower in the graph, and storing in association with the non-leaf node partial solutions representing sets of event messages meeting the evaluated constraint of the non-leaf node.

2. The method of claim 1, wherein each leaf node has an associated intra-event constraint;

when a received event message is found to satisfy the intra-event constraint of a leaf node, the parent node of the leaf-node is invoked.

3. The method of claim 1, wherein each leaf node has an associated intra-event constraint and an associated set of predefined relevant event parameters;

when a received event message is found to satisfy the intra-event constraint of a leaf node, the event message is stored in a value set associated with the leaf node, each value set comprising one or more event messages that correspond to the same relevant event parameter values, and the parent node of the leaf-node is invoked.

4. The method of claim 3, wherein the identifying includes determining whether the received event message satisfies the intra-event constraint of a leaf node;

when the event message is determined to satisfy the intra-event constraint, storing an identifier of the event message in an existing value set of the leaf node when there is an existing value set having relevant event parameter values matching the relevant parameter values of the event message, and otherwise creating a new value set for the leaf node using the relevant parameter values of the event message and storing an identifier of the event message in the new value set.

5. The method of claim 3, wherein the leaf node comprises a plurality of partial solutions and a plurality of value sets, each partial solution having a pointer to one value set.

6. The method of claim 3, wherein a partial solution stored in a non-leaf node comprises pointers to value sets from at least one leaf node.

7. The method of claim 3, wherein the inter-event constraint associated with the non-leaf node defines a relationship between at least two distinct leaf nodes, wherein the relationship is defined with respect to the relevant parameter values associated with the at least two leaf nodes.

8. The method of claim 3, wherein each relevant event parameter of a leaf node appears at least once in an inter-event constraint associated with a non-leaf node that is a parent node of the leaf node.

9. The method of claim 1, wherein a partial solution stored in a non-leaf node comprises pointers to partial solutions in at least one child node of the non-leaf node.

10. The method of claim 1, wherein the evaluating includes first applying a logical operation to the partial solutions stored at the child nodes of the non-leaf node;

if the logical operation returns TRUE, second applying the inter-event constraint to the partial solutions, and otherwise waiting for new event messages.

11. The method of claim 10, wherein the logical operation is selected from the set consisting of logical AND, logical OR, and logical AND NOT.

12. The method of claim 10, wherein the second applying includes retrieving a first set of event parameter values from one or more leaf nodes associated with the partial solutions of a first child node;

retrieving a second set of event parameter values from one or more leaf nodes associated with the partial solutions of a second child node; and generating a new partial solution having pointers to the partial solutions of the child nodes if the first and second sets of event parameter values satisfy the inter-event constraint associated with the non-leaf node.

13. The method of claim 1, wherein the graph of nodes includes a root node;

if the non-leaf node is the root node of the graph, the partial solutions associated with the non-leaf node comprise complete solutions; and for a particular complete solution, identifying event messages that satisfy the inter-event constraint of the root node.

14. The method of claim 1, wherein the graph of nodes includes a root node;

if the non-leaf node is the root node of the graph, the partial solutions associated with the non-leaf node comprise complete solutions; and the method includes generating an alert corresponding to at least one of the complete solutions.

15. The method of claim 1, including storing in high speed memory partial solutions of leaf and non-leaf nodes, thereby enabling real time processing of the stream of event messages.

16. The method of claim 1, wherein the stream of event messages include event messages generated by one or more intrusion detection sensors.

17. The method of claim 1, wherein the plurality of event parameters include source address, source port, destination address, destination port, IP protocol, timestamp, event type, and event id.

18. The method of claim 17, wherein the event id of each event message is unique to a device that generated the event message.

19. The method of claim 1, wherein the invoking of non-leaf nodes includes deferring invocations of at least some of the non-leaf nodes and processing the deferred invocations once per predefined evaluation period.

20. A system monitoring network security, comprising:

one or more central processing units for executing programs;

an interface for receiving event messages; and a rule evaluation engine module executable by the one or more central processing units, the module comprising:

data representing a graph of nodes, including a plurality of leaf nodes, a plurality of non-leaf nodes;

instructions for receiving a stream of event messages, each event message characterized by a plurality of event parameters;

instructions for identifying leaf nodes, if any, that correspond to an event message in the stream of event messages;

instructions for storing in association with the identified leaf nodes a partial solution identifying the event message; and instructions for invoking each of the plurality of non-leaf nodes at predefined times, wherein invoking a non-leaf node comprises evaluating an inter-event constraint associated with the non-leaf node utilizing the partial solutions stored for one or more nodes lower in the graph, and storing in association with the non-leaf node partial solutions representing sets of event messages meeting the evaluated constraint of the non-leaf node.

21. The system of claim 20, wherein each leaf node has an associated intra-event constraint;

when a received event message is found to satisfy the intra-event constraint of a leaf node, the parent node of the leaf-node is invoked.

22. The system of claim 20, wherein each leaf node has an associated intra-event constraint and an associated set of predefined relevant event parameters;

when a received event message is found to satisfy the intra-event constraint of a leaf node, the event message is stored in a value set associated with the leaf node, each value set comprising one or more event messages that correspond to the same relevant event parameter values, and the parent node of the leaf-node is invoked.

23. The system of claim 20, wherein the identifying includes determining whether the received event message satisfies the intra-event constraint of a leaf node;

when the event message is determined to satisfy the intra-event constraint, storing an identifier of the event message in an existing value set of the leaf node when there is an existing value set having relevant event parameter values matching the relevant parameter values of the event message, and otherwise creating a new value set for the leaf node using the relevant parameter values of the event message and storing an identifier of the event message in the new value set.

24. The system of claim 20, wherein the leaf node comprises a plurality of partial solutions and a plurality of value sets, each partial solution having a pointer to one value set.

25. The system of claim 20, wherein a partial solution stored in a non-leaf node comprises pointers to value sets from at least one leaf node.

26. The system of claim 20, wherein the inter-event constraint associated with the non-leaf node defines a relationship between at least two distinct leaf nodes, wherein the relationship is defined with respect to the relevant parameter values associated with the at least two leaf nodes.

27. The system of claim 20, wherein each relevant event parameter of a leaf node appears at least once in an inter-event constraint associated with a non-leaf node that is a parent node of the leaf node.

28. The system of claim 20, wherein a partial solution stored in a non-leaf node comprises pointers to partial solutions in at least one child node of the non-leaf node.

29. The system of claim 20, wherein the evaluating includes first applying a logical operation to the partial solutions stored at the child nodes of the non-leaf node;

if the logical operation returns TRUE, second applying the inter-event constraint to the partial solutions, and otherwise waiting for new event messages.

30. The system of claim 29, wherein the logical operation is selected from the set consisting of logical AND, logical OR, and logical AND NOT.

31. The system of claim 29, wherein the second applying includes retrieving a first set of event parameter values from one or more leaf nodes associated with the partial solutions of a first child node;

retrieving a second set of event parameter values from one or more leaf nodes associated with the partial solutions of a second child node; and generating a new partial solution having pointers to the partial solutions of the child nodes if the first and second sets of event parameter values satisfy the inter-event constraint associated with the non-leaf node.

32. The system of claim 20, wherein the graph of nodes includes a root node;

if the non-leaf node is the root node of the graph, the partial solutions associated with the non-leaf node comprise complete solutions; and for a particular complete solution, identifying event messages that satisfy the inter-event constraint of the root node.

33. The system of claim 20, wherein the graph of nodes includes a root node;

if the non-leaf node is the root node of the graph, the partial solutions associated with the non-leaf node comprise complete solutions; and the method includes generating an alert corresponding to at least one of the complete solutions.

34. The system of claim 20, including storing in high speed memory partial solutions of leaf and non-leaf nodes, thereby enabling real time processing of the stream of event messages.

35. The system of claim 20, wherein the stream of event messages include event messages generated by one or more intrusion detection sensors.

36. The system of claim 20, wherein the plurality of event parameters include source address, source port, destination address, destination port, IP protocol, timestamp, event type, and event id.

37. The system of claim 20, wherein the event id of each event message is unique to a device that generated the event message.

38. The system of claim 20, wherein the instructions for invoking non-leaf nodes include instructions for deferring invocations of at least some of the non-leaf nodes and for processing the deferred invocations once per predefined evaluation period.

39. A computer program product for use in conjunction with a computer system, the computer program product comprising a computer readable storage medium and a computer program mechanism embedded therein, the computer program mechanism comprising:

instructions for constructing a graph of nodes, including a plurality of leaf nodes, a plurality of non-leaf nodes;

instructions for receiving a stream of event messages, each event message characterized by a plurality of event parameters;

instructions for identifying leaf nodes, if any, that correspond to an event message in the stream of event messages;

instructions for storing in association with the identified leaf nodes a partial solution identifying the event message; and instructions for invoking each of the plurality of non-leaf nodes at predefined times, wherein invoking a non-leaf node comprises evaluating an inter-event constraint associated with the non-leaf node utilizing the partial solutions stored for one or more nodes lower in the graph, and storing in association with the non-leaf node partial solutions representing sets of event messages meeting the evaluated constraint of the non-leaf node.

40. The computer program product of claim 39, wherein each leaf node has an associated intra-event constraint;

when a received event message is found to satisfy the intra-event constraint of a leaf node, the parent node of the leaf-node is invoked.

41. The computer program product of claim 39, wherein each leaf node has an associated intra-event constraint and an associated set of predefined relevant event parameters;

when a received event message is found to satisfy the intra-event constraint of a leaf node, the event message is stored in a value set associated with the leaf node, each value set comprising one or more event messages that correspond to the same relevant event parameter values, and the parent node of the leaf-node is invoked.

42. The computer program product of claim 39, wherein the identifying includes determining whether the received event message satisfies the intra-event constraint of a leaf node;

when the event message is determined to satisfy the intra-event constraint, storing an identifier of the event message in an existing value set of the leaf node when there is an existing value set having relevant event parameter values matching the relevant parameter values of the event message, and otherwise creating a new value set for the leaf node using the relevant parameter values of the event message and storing an identifier of the event message in the new value set.

43. The computer program product of claim 39, wherein the leaf node comprises a plurality of partial solutions and a plurality of value sets, each partial solution having a pointer to one value set.

44. The computer program product of claim 39, wherein a partial solution stored in a non-leaf node comprises pointers to value sets from at least one leaf node.

45. The computer program product of claim 39, wherein the inter-event constraint associated with the non-leaf node defines a relationship between at least two distinct leaf nodes, wherein the relationship is defined with respect to the relevant parameter values associated with the at least two leaf nodes.

46. The computer program product of claim 39, wherein each relevant event parameter of a leaf node appears at least once in an inter-event constraint associated with a non-leaf node that is a parent node of the leaf node.

47. The computer program product of claim 39, wherein a partial solution stored in a non-leaf node comprises pointers to partial solutions in at least one child node of the non-leaf node.

48. The computer program product of claim 39, wherein the evaluating includes first applying a logical operation to the partial solutions stored at the child nodes of the non-leaf node;

if the logical operation returns TRUE, second applying the inter-event constraint to the partial solutions, and otherwise waiting for new event messages.

49. The computer program product of claim 48, wherein the logical operation is selected from the set consisting of logical AND, logical OR, and logical AND NOT.

50. The computer program product of claim 48, wherein the second applying includes retrieving a first set of event parameter values from one or more leaf nodes associated with the partial solutions of a first child node;

retrieving a second set of event parameter values from one or more leaf nodes associated with the partial solutions of a second child node; and generating a new partial solution having pointers to the partial solutions of the child nodes if the first and second sets of event parameter values satisfy the inter-event constraint associated with the non-leaf node.

51. The computer program product of claim 39, wherein the graph of nodes includes a root node;

if the non-leaf node is the root node of the graph, the partial solutions associated with the non-leaf node comprise complete solutions; and for a particular complete solution, identifying event messages that satisfy the inter-event constraint of the root node.

52. The computer program product of claim 39, wherein the graph of nodes includes a root node;

if the non-leaf node is the root node of the graph, the partial solutions associated with the non-leaf node comprise complete solutions; and the method includes generating an alert corresponding to at least one of the complete solutions.

53. The computer program product of claim 39, including storing in high speed memory partial solutions of leaf and non-leaf nodes, thereby enabling real time processing of the stream of event messages.

54. The computer program product of claim 39, wherein the stream of event messages include event messages generated by one or more intrusion detection sensors.

55. The computer program product of claim 39, wherein the plurality of event parameters include source address, source port, destination address, destination port, IP protocol, timestamp, event type, and event id.

56. The computer program product of claim 39, wherein the event id of each event message is unique to a device that generated the event message.

57. The computer program product of claim 39, wherein the instructions for invoking non-leaf nodes include instructions for deferring invocations of at least some of the non-leaf nodes and for processing the deferred invocations once per predefined evaluation period.

* * * * *